UNITED STATES PATENT OFFICE.

ARTHUR W. BULL, OF HAVERFORD, PENNSYLVANIA.

CREAM-WHIP COMPOSITION.

1,378,762.   Specification of Letters Patent.   Patented May 17, 1921.

No Drawing.   Application filed March 19, 1920. Serial No. 367,159.

*To all whom it may concern:*

Be it known that I, ARTHUR W. BULL, a citizen of the United States, residing at Haverford, in the county of Delaware and State of Pennsylvania, have invented new and useful Improvements in Cream-Whip Compositions, of which the following is a specification.

An object of my invention is to provide a composition for facilitating the whipping of different kinds and consistencies of cream and in the preparation of analogous products such as ice cream and the like.

To this end the invention comprehends a cream whip composition which can be prepared or manufactured at a low cost and in the use of which a relatively small quantity, added to the substance to be whipped, will result in a mixture which will lend itself readily to the whipping operation even though the cream initially employed is of a comparatively thin or low consistency.

I am aware that compositions for whipping cream have been used heretofore as for instance the use of lactic acid as a whipping agent and I am also aware of the fact that a saccharate such as calcium saccharate may be employed, *i. e.*, a solution of calcium saccharate in water. With my composition, however, I find that the whipping operation, to obtain the desired result, is more readily and quickly accomplished and the resulting product is one of a higher standard than a cream whipped with the addition of the well known agents mentioned above.

My composition consists substantially of a mixture of a strong sugar solution with an excess of slaked lime (calcium hydroxid), after which an acid is added to partially neutralize the alkalinity of the mixture. The clear liquid is subsequently drawn off and becomes the finished product for use with the cream or other product to be whipped, in the necessary proportions.

In preparing the composition I prepare an approximately 30% sugar solution, consisting of sugar and water to the mentioned proportion and this solution is agitated with a quantity of slaked lime, the latter being slightly in excess so that not quite all of it will be dissolved in the solution. After settling, the clear liquid is drawn off and a quantity of acid such as hydrochloric or some similar neutralizing agent is added to the mixture, the amount of such acid employed depending primarily upon the character of the mixture and in this particular instance an amount sufficient to bring about a neutralization of approximately one-sixth of the mixture, is added to obtain the best result. It will now be apparent that the acid will only partially—*i. e.*, about one-sixth—neutralize the alkalinity of the mixture and upon addition of the acid as mentioned, I obtain the finished product which is now ready to be added to the cream or other substance which it is desired to whip to the desired density. I have mentioned hydrochloric acid as suitable, since the calcium salt thereof is readily soluble. Obviously, acids of which the calcium salts are insoluble or difficultly soluble in water or alkaline liquids would not produce the same result.

The composition described is to be distinguished from the product, lactic acid, previously referred to, by the fact that my composition in its final stage is still alkaline and therefor devoid of free acid, whereas with the mentioned known product this is not the case, it being readily apparent that the presence of free acid would detract from the desired product because of the undesirable presence of an acid taste.

My composition furthermore can be quickly and inexpensively prepared and has been found to be far more efficient as a cream whip than the known products heretofore employed and previously set out herein.

Having described my invention, I claim—

1. A composition for whipping cream comprising the reaction products of the following materials, namely a strong sugar solution, an excess of slaked lime and a small amount of a neutralizing acid, such acid being one of which the calcium salt is freely soluble in alkaline solutions.

2. A composition for whipping cream comprising the reaction products of the following materials, namely a strong sugar solution, an excess of slaked lime and a sufficient amount of hydrochloric acid to partially neutralize the mixture.

3. A composition for whipping cream comprising the reaction products of the following materials, namely sugar, water, lime and hydrochloric acid chemically equivalent to about one-sixth of the amount of lime which could be dissolved in the amount of sugar and water solution.

In testimony whereof I affix my signature.

ARTHUR W. BULL.